(12) United States Patent
Seto et al.

(10) Patent No.: US 11,750,991 B2
(45) Date of Patent: Sep. 5, 2023

(54) INFORMATION PROVIDING METHOD, INFORMATION PROVISION SYSTEM, AND INFORMATION PROCESSING METHOD

(71) Applicant: YAMAHA CORPORATION, Hamamatsu (JP)

(72) Inventors: Yuki Seto, Moriya (JP); Takahiro Iwata, Tokyo (JP)

(73) Assignee: YAMAHA CORPORATION, Hamamatsu (JP)

( * ) Notice: Subject to any disclaimer, the term of this patent is extended or adjusted under 35 U.S.C. 154(b) by 366 days.

(21) Appl. No.: 17/239,867

(22) Filed: Apr. 26, 2021

(65) Prior Publication Data

US 2021/0243542 A1 Aug. 5, 2021

Related U.S. Application Data

(63) Continuation of application No. PCT/JP2019/042509, filed on Oct. 30, 2019.

(30) Foreign Application Priority Data

Nov. 9, 2018 (JP) ................................. 2018-211608

(51) Int. Cl.
*H04W 4/06* (2009.01)
*H04R 27/00* (2006.01)
*H04W 4/029* (2018.01)

(52) U.S. Cl.
CPC ............ *H04R 27/00* (2013.01); *H04W 4/029* (2018.02); *H04W 4/06* (2013.01)

(58) Field of Classification Search
CPC ......... H04R 27/00; H04W 4/029; H04W 4/06
(Continued)

(56) References Cited

U.S. PATENT DOCUMENTS 10,243,676 B2 *  3/2019  Nakamura .......... G06Q 30/0267
2003/0012444 A1 *  1/2003  Inoue .................. H04N 1/3217
                                                              382/232
(Continued)

FOREIGN PATENT DOCUMENTS

CN    1933517 A    3/2007
CN  103562847 A    2/2014
(Continued)

OTHER PUBLICATIONS

English translation of Written Opinion issued in Intl. Appln. No. PCT/JP2019/042509 dated Jan. 7, 2020, previously cited in IDS filed Apr. 26, 2021.
(Continued)

*Primary Examiner* — April G Gonzales
(74) *Attorney, Agent, or Firm* — ROSSI, KIMMS & McDOWELL LLP

(57) ABSTRACT

An information providing method receives, from a terminal apparatus, terminal position information representative of a position of the terminal apparatus; identifies, from among a plurality of pieces of distribution information stored in a reference table in which correspondences between the plurality pieces of distribution information and a plurality of pieces of sound output position information are registered, a piece of distribution information corresponding to a piece of sound output position information identified based on the position of the terminal apparatus represented by the received terminal position information; and transmitting the identified piece of distribution information to the terminal apparatus. Each of the plurality of pieces of distribution information relates to a position at which a corresponding one of sound output devices outputs sound, and each of the plurality of pieces of sound output position information is
(Continued)

representative of a position at which the corresponding sound output device outputs the sound.

13 Claims, 5 Drawing Sheets

(58) Field of Classification Search
USPC .......................................................... 455/3.06
See application file for complete search history.

(56) References Cited

U.S. PATENT DOCUMENTS

| | | | | |
|---|---|---|---|---|
| 2007/0071204 | A1* | 3/2007 | Kanada | H04M 3/56 |
| | | | | 379/158 |
| 2014/0089314 | A1* | 3/2014 | Iizuka | G06F 16/9535 |
| | | | | 707/740 |
| 2014/0199082 | A1* | 7/2014 | Iizuka | H04B 10/116 |
| | | | | 398/172 |
| 2017/0153117 | A1* | 6/2017 | Kawase | H04N 21/2146 |
| 2017/0206195 | A1* | 7/2017 | Moriguchi | G06Q 50/10 |

FOREIGN PATENT DOCUMENTS

| | | |
|---|---|---|
| CN | 103945108 A | 7/2014 |
| CN | 104160714 A | 11/2014 |
| CN | 104220997 A | 12/2014 |
| JP | 2007158789 A | 6/2007 |
| JP | 2016075956 A | 5/2016 |
| JP | 2016136363 A | 7/2016 |
| JP | 2017107532 A | 6/2017 |
| JP | 2017167559 A | 9/2017 |
| JP | 2017175534 A | 9/2017 |

OTHER PUBLICATIONS

Office Action issued in Chinese Appln. No. 201980069243.1 dated Dec. 23, 2021. English machine translation provided.

International Search Report issued in Intl. Appln. No PCT/JP2019/042509 dated Jan. 7, 2020. English translation provided.

Written Opinion issued in Intl. Appln. No. PCT/JP2019/042509 dated Jan. 7, 2020.

* cited by examiner

INFORMATION PROVIDING METHOD, INFORMATION PROVISION SYSTEM, AND INFORMATION PROCESSING METHOD

CROSS-REFERENCE TO RELATED APPLICATION

This application is a Continuation Application of PCT Application No. PCT/JP2019/042509, filed Oct. 30, 2019, and is based on and claims priority from Japanese Patent Application No. 2018-211608, filed on Nov. 9, 2018, the entire contents of each of which are incorporated herein by reference.

BACKGROUND

Technical Field

This disclosure relates to technology for providing various types of information to terminal apparatuses.

Background Information

For facilities such as transportation or commerce (or retail) facilities, technologies have been proposed for provision of facility-related information to terminal apparatuses of visitors of such facilities. For example, Japanese Patent Application Laid-Open Publication 2016-75956 (hereafter, Patent Document 1) discloses a technology that transmits identification information to a terminal apparatus through sound communication using a sound output device in a facility, and displays related information indicated by the identification information on the terminal apparatus.

Patent Document 1 discloses sound communication via a frequency band in which sound is scarcely acoustically audible. However, depending on characteristics (e.g., reproducible band) of a sound output device, situations occur in which it is difficult to output sound in a frequency band that is suitable for sound communication. A situation in which sound communication is limited as illustrated above is assumed in actuality.

SUMMARY

An object of one aspect of the present disclosure is to provide terminal apparatuses with distribution information related to sound output by a sound output device even in situations where sound communication is limited.

To solve the above problem, an information providing method according to one aspect of the present disclosure receives, from a terminal apparatus, terminal position information representative of a position of the terminal apparatus; identifies, from among a plurality of pieces of distribution information stored in a reference table in which correspondences between the plurality pieces of distribution information and a plurality of pieces of sound output position information are registered, a piece of distribution information corresponding to a piece of sound output position information identified based on the position of the terminal apparatus represented by the received terminal position information; and transmitting the identified piece of distribution information to the terminal apparatus. Here, each of the plurality of pieces of distribution information relates to a position at which a corresponding one of sound output devices outputs sound, and each of the plurality of pieces of sound output position information is representative of a position at which the corresponding sound output device outputs the sound.

An information provision system according to one aspect of the present disclosure includes a receiver; a transmitter; and at least one processor configured to execute stored instructions to: control the receiver to receive terminal position information representative of a position of the terminal apparatus; identify, from among a plurality of pieces of distribution information stored in a reference table in which correspondences between the plurality pieces of distribution information and a plurality of pieces of sound output position information are registered, a piece of distribution information corresponding to a piece of sound output position information identified based on the position of the terminal apparatus represented by the received terminal position information, where each of the plurality of pieces of distribution information relates to a position at which a corresponding one of the sound output devices outputs sound, and each of the plurality of pieces of sound output position information is representative of a position at which the corresponding sound output device outputs sound; and control the transmitter to transmit the identified piece of distribution information to the terminal apparatus.

An information processing method according to one aspect of the present disclosure is implemented by a broadcast system communicable with an information provision system configured to register in a reference table a correspondence between distribution information relating to a position at which a sound output device outputs sound, and sound output position information representative of the position at which the sound output device outputs the sound, the method comprising: outputting sound via a sound output device; and transmitting, to the information provision system, distribution information relating to a position at which the sound output device outputs sound and sound output position information representative of the position at which the sound is output.

DETAILED DESCRIPTION

A: First Embodiment

Figure 1:
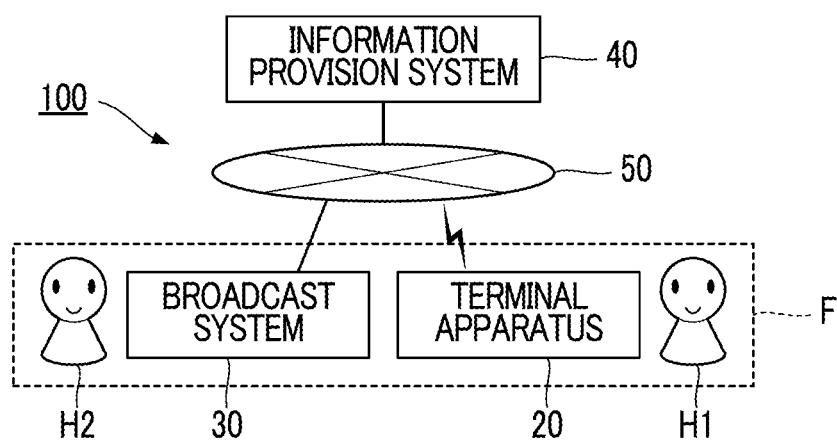
FIG. 1 is a block diagram illustrating a configuration of a management system in the first embodiment.

FIG. 1 is a block diagram illustrating a configuration of a management system 100 according to a first embodiment of the present disclosure. The management system 100 is a computer system for providing information to a user H1 who is present in one of various facilities F (hereafter, "facility"), such as a commerce facility. The user H1 visits a facility F while carrying a terminal apparatus 20. The terminal apparatus 20 is, for example, a portable information terminal, such as a cell phone, smartphone, tablet device, or personal computer. For convenience, the following description focuses on a terminal apparatus 20 used by a single user H1 present in the facility F, although in actuality multiple users H1 are likely to be present in the facility F. A display terminal for guidance, such as an electronic signboard (e.g., digital signage), installed in the facility F may be used as the terminal apparatus 20.

As shown in FIG. 1, the management system 100 comprises a broadcast system 30 and an information provision system 40. The information provision system 40 is able to communicate with each of the terminal apparatus 20 and the broadcast system 30 via a communication network 50, such as a mobile communication network or the Internet, for example.

A1: Broadcast System 30

The broadcast system 30 outputs sound (hereafter, "notification voice") in the facility F. The notification voice consists of sound for provision of a variety of information to users H1 in the facility F. The notification voice may be a guidance voice to guide users through the facility F, an emergency voice to alert users of the facility F to an occurrence of an emergency such as an earthquake or fire, and a paging voice to page a user H1 in the facility F (e.g., lost child announcement).

Figure 2:
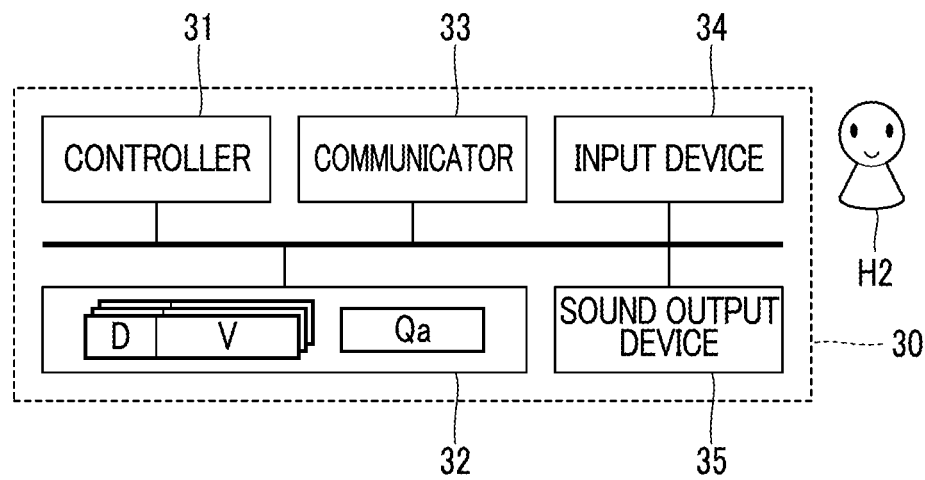
FIG. 2 is a block diagram illustrating a configuration of a broadcast system.

FIG. 2 is a block diagram illustrating a configuration of the broadcast system 30. The broadcast system 30 of the first embodiment comprises a controller 31, a storage device 32, a communicator 33, an input device 34, and a sound output device 35. The broadcast system 30 can be realized by use of a single device or by use of separately configured multiple devices.

The controller 31 comprises one or more processors that control each element of the broadcast system 30. For example, the controller 31 comprises one or more of different types of processors, such as a Central Processing Unit (CPU), Sound Processing Unit (SPU), Digital Signal Processor (DSP), Field Programmable Gate Array (FPGA), or Application Specific Integrated Circuit (ASIC). The communicator 33 communicates with the information provision system 40 via the communication network 50 under control of the controller 31.

The storage device 32 comprises a single memory or multiple memories for storing programs executed by the controller 31 and various data used by the controller 31. For example, known recording media, such as semiconductor recording media and magnetic recording media, or a combination of multiple types of recording media, may be used as the storage device 32. A portable recording medium that is detachable from the broadcast system 30, or an external recording medium (e.g., online storage) with which the broadcast system 30 can communicate, may also be used as the storage device 32.

The storage device 32 of the first embodiment stores a sound signal V and identification information D for each of a plurality of types of notification voices. The sound signal V of each notification voice is a signal representative of a waveform of the notification voice. The sound signal V is stored in the storage device 32 in the form of a file in a freely selected format. The identification information D of each notification voice is a code string for identifying information related to the notification voice (hereafter, "related information") C. The related information C in the first embodiment is text (a string of characters) representative of content of the notification voice in a language that is the same as or different from the notification voice. Since the related information C is provided for each notification voice, the identification information D also serves as information for identifying the notification voice.

The storage device 32 stores sound output position information Qa. The sound output position information Qa is information representative of a position at which a notification voice is output by the broadcast system 30. The sound output position information Qa may be freely selected information for identifying a position at which the notification voice is output, for example, a position (e.g., latitude and longitude) measured in the facility F by use of a satellite positioning system, such as GPS (Global Positioning System), a name or address of the facility F, or the like. Thus, the sound output position information Qa stored in the storage device 32 serves as information representative of the position of the sound output device 35.

The input device 34 accepts instructions from an administrator H2 of the broadcast system 30 (e.g., an employee of the facility F). Specifically, the administrator H2 selects as appropriate one of a plurality of notification voices by manipulating the input device 34. The sound output device 35 outputs sound indicated by the controller 31. The sound output device 35 of the first embodiment outputs the notification voice in the facility F.

A2: Information Provision System 40

Figure 3:
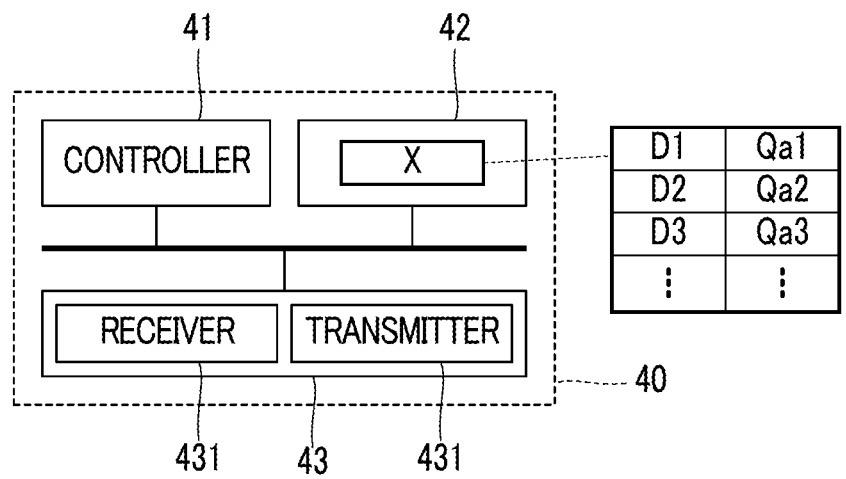
FIG. 3 is a block diagram illustrating a configuration of an information provision system.

FIG. 3 is a block diagram illustrating a configuration of the information provision system 40. The information provision system 40 of the first embodiment comprises a controller 41, a storage device 42, and a communicator 43. The information provision system 40 may be realized by use of a single device or by use of separately configured multiple devices.

The controller 41 comprises one or more processors that control each element of the information provision system 40. For example, the controller 41 comprises one or more of different types of processors, such as a CPU, SPU, DSP, FPGA, or ASIC. The communicator 43 communicates with each of the terminal apparatus 20 and the broadcast system 30 via the communication network 50 under control of the controller 41. The communicator (communication interface) 43 of the first embodiment comprises a receiver 431 and a transmitter 432. The receiver 431 receives information from the terminal apparatus 20 or the broadcast system 30. The transmitter 432 transmits information to the terminal apparatus 20 or the broadcast system 30.

The storage device 42 comprises a single memory or multiple memories for storing programs executed by the controller 41 and various data used by the controller 41. For example, known recording media, such as semiconductor recording media and magnetic recording media, or a combination of multiple types of recording media, may be used as the storage device 42. Also, a portable recording medium that is detachable from the information provision system 40, or an external recording medium with which the information provision system 40 can communicate, may be used as the storage device 42. The storage device 42 of the first embodiment stores a reference table X. The reference table X is a data table that associates identification information D (D1, D2, . . . ) of notification voices output by the sound output device 35 of the broadcast system 30, with the sound output position information Qa (Qa1, Qa2, . . . ) representative of positions at which the notification voices are output.

A3: Terminal Apparatus 20

Figure 4:
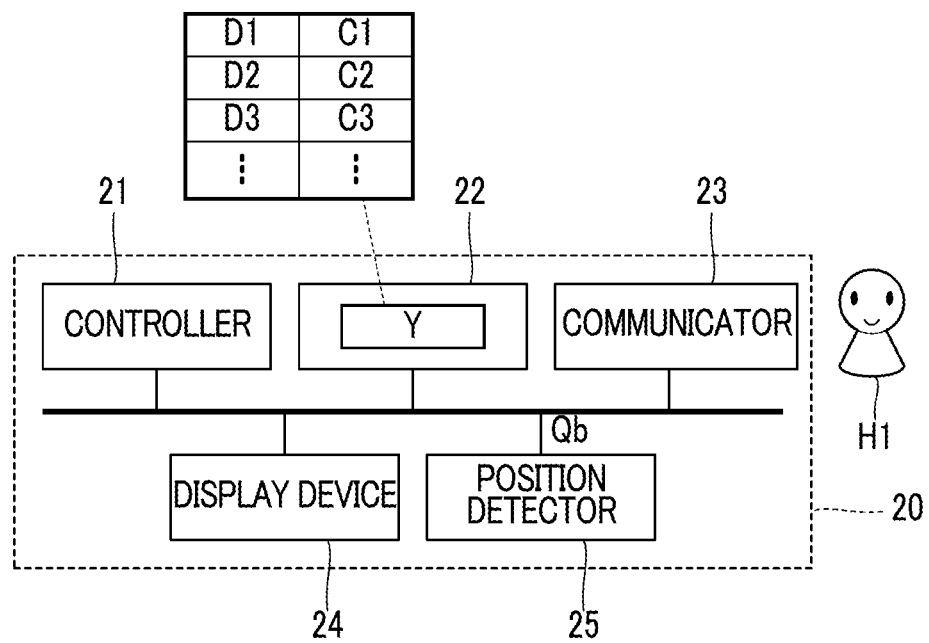
FIG. 4 is a block diagram illustrating a configuration of a terminal apparatus.

FIG. 4 is a block diagram illustrating a configuration of the terminal apparatus 20. As shown in FIG. 4, the terminal apparatus 20 comprises a controller 21, a storage device 22, a communicator 23, a display device 24, and a position detector 25. The controller 21 comprises one or more processors that control each element of the terminal apparatus 20. For example, the controller 21 comprises one or more of different types of processors such as a CPU, SPU, DSP, FPGA, or ASIC. The communicator 23 communicates with the information provision system 40 via the communication network 50 under control of the controller 21. The display device 24 displays an image indicated by the controller 21. Instead of the display device 24 being configured as an integral part of the terminal apparatus 20, a separate display device 24 may be connected to the terminal apparatus 20 either by wire or wirelessly. The position detector 25 generates information Qb representative of the position of the terminal apparatus 20 (hereafter, "terminal position information"). Specifically, a positioning device that generates terminal position information Qb by receiving and analyzing radio waves from multiple positioning satellites of a satellite positioning system, such as a GPS, is used as the position detector 25, for example.

The storage device 22 comprises a single memory or multiple memories for storing programs executed by the controller 21 and various data used by the controller 21. For example, known recording media, such as semiconductor recording media and magnetic recording media, or a combination of multiple types of recording media, may be used as the storage device 22. The storage device 22 of the first embodiment stores a reference table Y. The reference table Y is a data table in which related information C (C1, C2, . . . ) is registered for each of a plurality of pieces of identification information D (D1, D2, . . . ) corresponding to different notification voices. There is registered, for identification information D of each notification voice, related information C (e.g., text representative of content of the notification voice) that is related to that notification voice.

Figure 5:
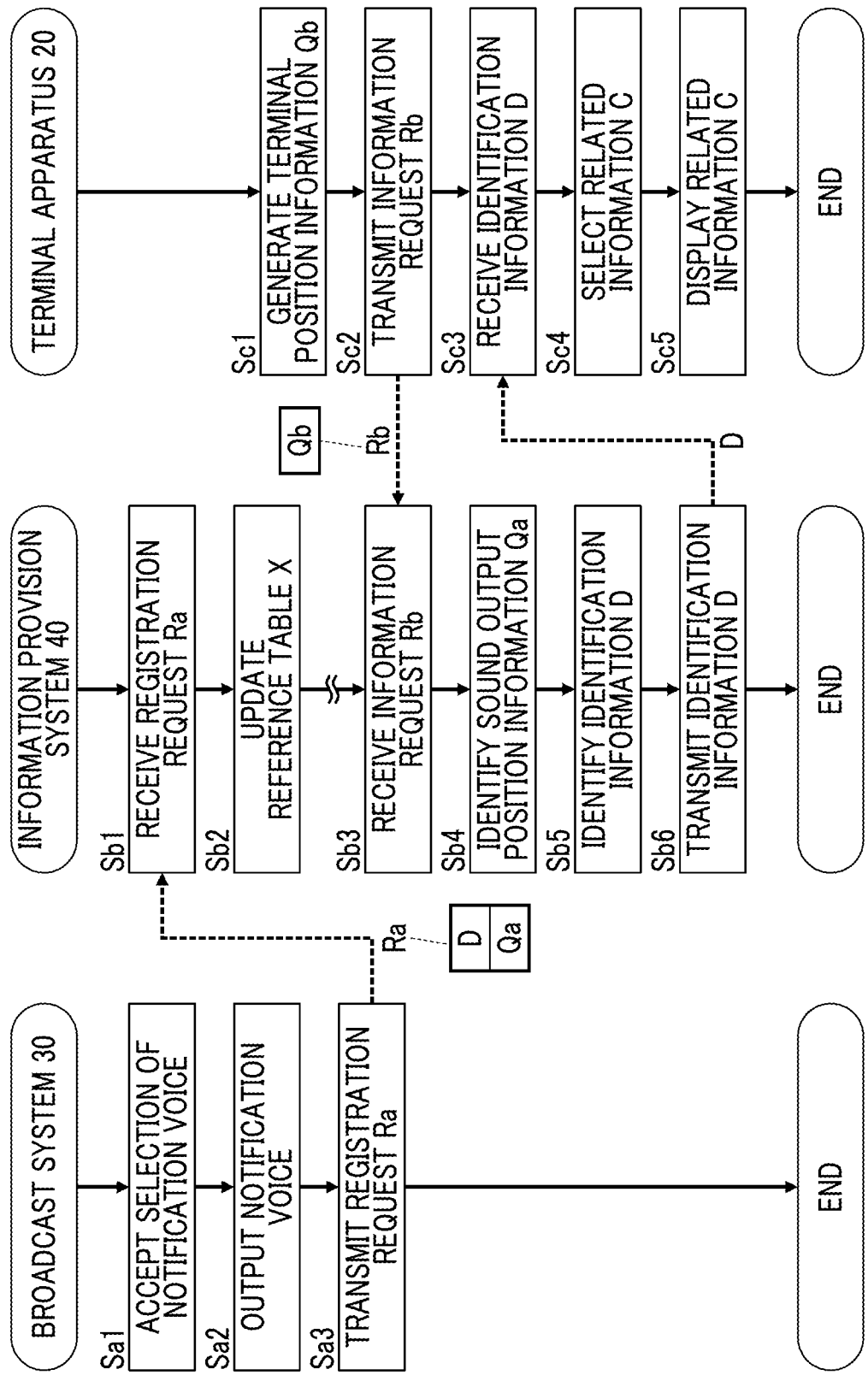
FIG. 5 is a flowchart illustrating an operation of the first embodiment.

FIG. 5 is a flowchart illustrating a specific procedure of an operation of the management system 100. The administrator H2 of the broadcast system 30 selects one of a plurality of notification voices by manipulating the input device 34. Upon accepting the selection of the notification voice (Sa1), the controller 31 obtains from the storage device 32 a sound signal V of the notification voice and supplies the sound signal V to the sound output device 35 (Sa2). In this way, the notification voice selected by the administrator H2 is output from the sound output device 35 in the facility F.

The controller 31 transmits a registration request Ra to the information provision system 40 from the communicator 33 (Sa3). The registration request Ra includes identification information D of the notification voice selected by the administrator H2 and sound output position information Qa of the facility F. A registration request Ra is transmitted (Sa3) each time a notification voice is output by the sound output device 35 (i.e., upon each selection of a notification voice by the administrator H2). It is of note that output of the notification voice (Sa2) and transmission of the registration request Ra (Sa3) may be carried out in reverse order.

The controller 41 of the information provision system 40 receives via the receiver 431 the registration request Ra transmitted from the broadcast system 30 (Sb1). The controller 41 updates the reference table X in accordance with the registration request Ra (Sb2). Specifically, the controller 41 adds to the reference table X a pair of the identification information D and the sound output position information Qa contained in the registration request Ra. As will be understood from the above description, each time a notification voice is output by the sound output device 35, the controller 41 executes the process of obtaining identification information D and sound output position information Qa (Sb1), and executes the process of registering in the reference table X a correspondence between the identification information D and the sound output position information Qa (Sb2).

The user H1, who is present in the facility F, instructs the terminal apparatus 20 to obtain related information C. Upon receiving the instruction from the user H1, the controller 21 of the terminal apparatus 20 causes the position detector 25 to generate terminal position information Qb (Sc1). The controller 21 transmits an information request Rb to the information provision system 40 from the communicator 23 (Sc2). The information request Rb is a signal for requesting the identification information D of the notification voice output in the facility F, and includes the terminal position information Qb generated by the position detector 25. As will be understood from the above description, the controller 21 serves as an element (transmission controller) that transmits terminal position is information Qb from the communicator 23, which is an example of a transmitter, to the information provision system 40.

The controller 41 of the information provision system 40 receives by the receiver 431 the information request Rb transmitted from the terminal apparatus 20 (Sb3). In other words, the controller 41 serves as an element (reception controller) that receives terminal position information Qb via the receiver 431.

Upon receiving the information request Rb from the terminal apparatus 20, the controller 41 of the information provision system 40 identifies, by referring to the reference table X stored in the storage device 42, identification information D that corresponds to sound output position information Qa that is identified based on a position represented by the terminal position information Qb in the information request Rb (Sb4, Sb5). Specifically, the controller 41 identifies, from among the plurality of sound output position information Qa registered in the reference table X, sound output position information Qa that represents a position closest to the position represented by the terminal position information Qb (Sb4). Namely, identified is the sound output position information Qa in the facility F where the terminal apparatus 20 is located. Then, the controller 41 identifies in the reference table X identification information D that corresponds to the sound output position information Qa (Sb5). Namely, identified is the identification information D of the notification voice output in the facility F where the terminal apparatus 20 is located.

In a case that the sound output device 35 sequentially outputs multiple types of notification voices in the facility F, multiple pieces of identification information D may be registered in the reference table X for the sound output position information Qa of the facility F. In a case that multiple pieces of identification information D having the same sound output position information Qa are registered in the reference table X as described above, the controller 41 identifies, for example, identification information D most recently registered from among the multiple pieces of identification information D, for example (Sb5). As will be understood from the above description, the controller 41 serves as an element (information processor) for identifying identification information D that corresponds to the sound output position information Qa identified based on the position represented by the terminal position information Qb by referring to the reference table X.

The controller 41 transmits the identification information D identified in the above process (Sb4 and Sb5) from the transmitter 432 to the terminal apparatus 20, which transmitted the information request Rb (Sb6). In other words, the controller 41 serves as an element (transmission controller) for transmitting, from the transmitter 432 to the terminal apparatus 20, the identification information D identified from the reference table X based on the terminal position information Qb.

The information request Rb is repeatedly transmitted by the terminal is apparatus 20 (Sc2) in a predetermined cycle, for example. Each time the controller 41 of the information provision system 40 receives the information request Rb, the controller 41 transmits to the terminal apparatus 20 identification information D that corresponds to the terminal position information Qb contained in the information request Rb. However, the controller 41 does not necessarily have to transmit to the terminal apparatus 20 identification information D that has already been transmitted to the terminal apparatus 20.

The controller 21 of the terminal apparatus 20 receives by the communicator 23 the identification information D transmitted from the information provision system 40 (Sc3). Namely, the controller 21 serves as an element (reception controller) that receives identification information D from the information provision system 40 by the communicator 23, which is an example of a receiver. From among a plurality of pieces of related information C registered in the reference table Y the controller 21 selects related information C that corresponds to the identification information D received from the information provision system 40 (Sc4). The controller 21 displays the related information C selected from the reference table Y on the display device 24 (Sc5). As will be understood from the above description, related information C that is related to the notification voice output in the facility F is displayed on the display device 24 of the terminal apparatus 20 situated in the facility F. Therefore, the user H1 of the terminal apparatus 20 upon viewing the image on the display device 24 is able to understand the content of the notification voice output in the facility F.

For example, if text in the same language as that of the notification voice is used as the related information C, a hearing-impaired person who has difficulty hearing the notification voice is able to understand the content of the notification voice by viewing the display of the terminal apparatus 20. Also, for example, if text in a language different to that of the notification voice is used as the related information C, a user H1 (for example, a visitor from abroad) who is unable to understand the language of the notification voice is able to understand the content of the notification voice by viewing the display of the terminal apparatus 20.

As described above, the reference table X is updated each time a notification voice is output (Sb2), and the terminal apparatus 20 repeatedly transmits an information request Rb (Sc2). Thus, identification information D of a plurality of notification voices is transmitted to the terminal apparatus 20 in real time in conjunction with output by the sound output device 35 of the plurality of notification voices. Namely, in real time in conjunction with output of the plurality of notification voices, it is possible to show at the terminal apparatus 20 the corresponding related information C for each of the plurality of notification voices.

As explained above, in the first embodiment, identification information D of a notification voice output by the sound output device 35 is registered in the reference table X, and identification information D is transmitted to the terminal apparatus 20, with the identification information D corresponding to terminal position information Qb that has been transmitted from the terminal apparatus 20. Therefore, an advantage is obtained in that it is possible provide to the terminal apparatus 20 identification information D corresponding to a notification voice output by the sound output device 35 even in a situation where it is difficult to transmit the identification information D to the terminal apparatus 20 by sound communication using the sound output device 35.

B: Second Embodiment

Description will now be given of a second embodiment of the present disclosure. In the following examples, for elements whose functions are the same as those of the first embodiment, the same reference signs as used in the description of the first embodiment are used, and detailed description thereof is omitted as appropriate.

Figure 6:
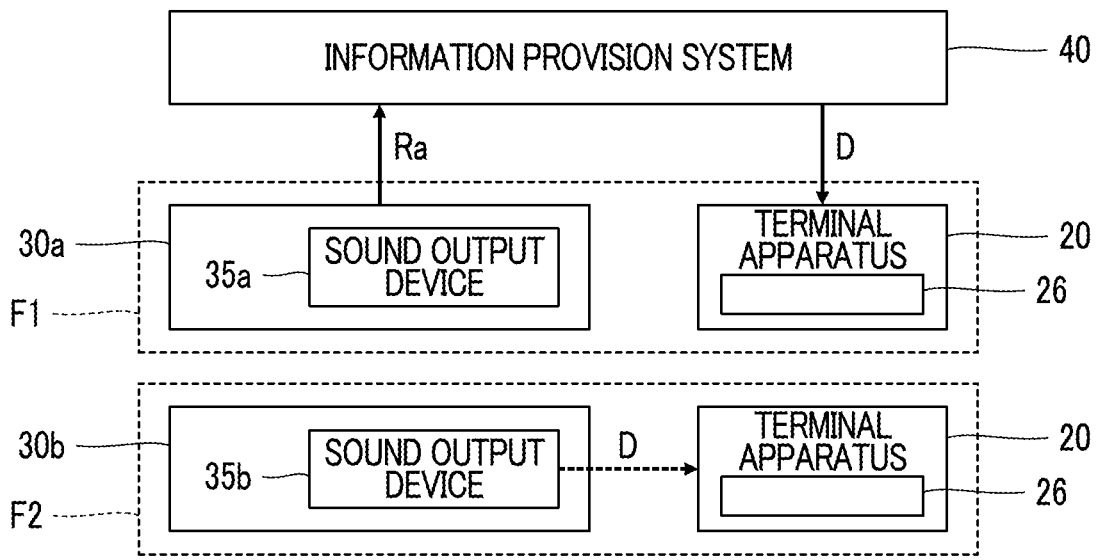
FIG. 6 is a block diagram illustrating a configuration of a management system in the second embodiment.

As shown in FIG. 6, in the second embodiment a first facility F1 and a second facility F2 are assumed. A broadcast system 30a is installed in the first facility F1, and a broadcast system 30b is installed in the second facility F2. The broadcast system 30a of the first facility F1 has the same configuration as that of the broadcast system 30 of the first embodiment. Specifically, the broadcast system 30 transmits a registration request Ra including identification information D of a notification voice and sound output position information Qa of the first facility F1 to the information provision system 40 each time the notification voice is output by the sound output device 35a. The sound output device 35a of the broadcast system 30a is not capable of outputting sound in a frequency band that is scarcely audible to humans (hereafter, "scarcely audible band").

In contrast, the broadcast system 30b of the second facility F2 comprises a sound output device 35b capable of outputting sound in the scarcely audible band. The sound output device 35b is supplied with a sound signal V that includes a sound component of the notification voice selected by the administrator H2 and a sound component of the identification information D of the notification voice. Thus, as shown in FIG. 6, the sound component of the identification information D is output from the sound output device 35b in conjunction with output of the notification voice. Namely, the sound output device 35b serves not only as a broadcast device that outputs the notification voice, but also as a transmitter that transmits the identification information D to the terminal apparatus 20 via sound communication using sound waves as a transmission medium. The identification information D is output in the form of a sound component within the scarcely audible band (e.g., a sound component of 18 kHz or more and 20 kHz or less). Consequently, while the notification voice is audible to the user H1 in the second facility F2, the sound component of the identification information D is scarcely audible to the user H1. The identification information D is transmitted by the sound output device 35b each time the notification voice is output by the sound output device 35b.

The terminal apparatus 20 comprises a sound receiving device 26 that receives sounds in its vicinity. The terminal apparatus 20 located in the second facility F2 receives sound output by the sound output device 35b and generates an audio signal representative of a waveform of the sound (hereafter, "received sound signal"). The received sound signal includes the sound component of the identification information D. As will be understood from the above description, the sound receiving device 26 of the terminal apparatus 20 is used for recording sound during voice communication or video recording, and also serves as a receiver that receives the identification information D by sound communication. As described above, the identification information D of the notification voice need not be transmitted from the broadcast system 30b to the information provision system 40 because the identification information D is transmitted to the terminal apparatus 20 by sound communication in the second facility F2. Accordingly, the communicator 33 is omitted in the broadcast system 30b.

Figure 7:
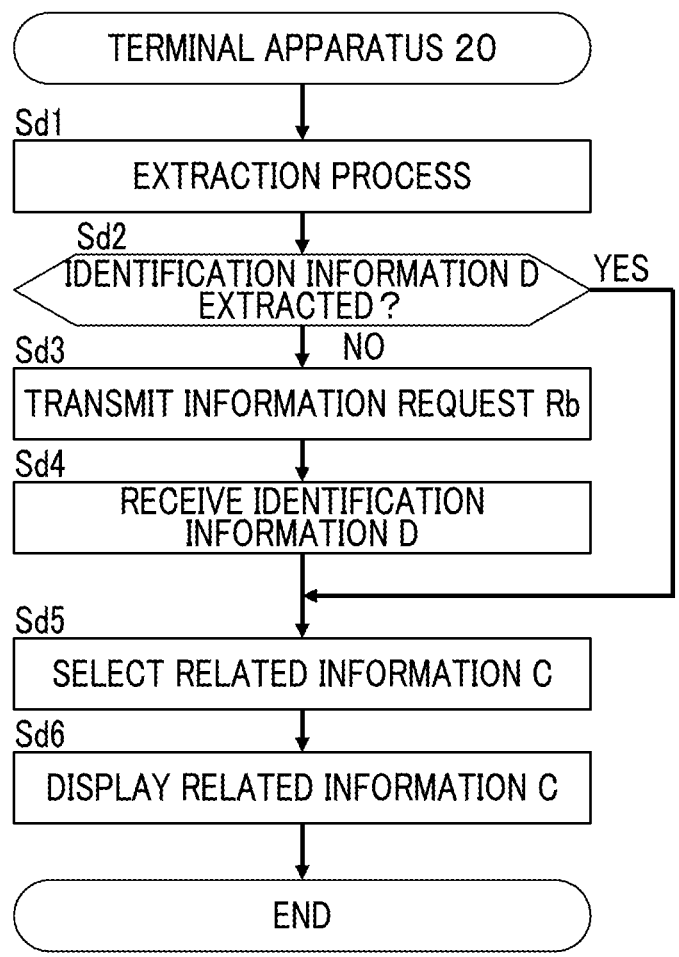
FIG. 7 is a flowchart illustrating an operation of a terminal apparatus in the second embodiment.

FIG. 7 is a flowchart illustrating a specific procedure of an operation of the terminal apparatus 20 in the second embodiment. The operation of the terminal apparatus 20 illustrated in FIG. 5 is replaced by the operation illustrated in FIG. 7. The operation of the broadcast system 30 and that of the information provision system 40 are the same as those illustrated in FIG. 5. A user H1 who is present in the first or second facility F1 or F2 instructs the terminal apparatus 20 to obtain related information C. Upon receiving the instruction from the user H1, the controller 21 of the terminal apparatus 20 executes an extraction process for extracting identification information D from the received sound signal generated by the sound receiving device 26 (Sd1). The extraction process includes, for example, an emphasizing process for emphasizing sound components in the sound signal in the scarcely audible band, and a demodulation process for demodulating the identification information D from the emphasized sound signal. The controller 21 determines whether the identification information D is extracted by the extraction process (Sd2). In a case that the terminal apparatus 20 is located in the second facility F2, the identification information D is extracted by the extraction process (Sd2: YES). Namely, the identification information D is transmitted to the terminal apparatus 20 by sound communication by means of the sound output device 35b.

On the other hand, in a case that the terminal apparatus 20 is located in the first facility F1, the identification information D is not extracted even if the extraction process is executed. If the identification information D is not extracted (Sd2: NO), the controller 21 transmits an information request Rb including terminal position information Qb generated by the position detector 25, from the communicator 23 to the information provision system 40 (Sd3). Thus, the information provision system 40 receives the terminal position information Qb, which is transmitted by the terminal apparatus 20 when the identification information D is not extracted by the extraction process. Upon receiving the information request Rb transmitted by the terminal apparatus 20, the controller 41 of the information provision system 40 identifies identification information D that is identified based on the terminal position information Qb from the reference table X, and transmits the identification information D to the requesting terminal apparatus 20 (Sb3 to Sb6). That is, the identification information D of the notification voice output in the first facility F1 is transmitted to the terminal apparatus 20. The controller 21 of the terminal apparatus 20 receives the identification information D transmitted from the information provision system 40 (Sd4). As described above, when the terminal apparatus 20 is located in the first facility F1, the identification information D of the notification voice is transmitted to the terminal apparatus 20 by use of the same operation as that in the first embodiment. Therefore, in the second embodiment, the same effect is realized as in the first embodiment.

As described above, the terminal apparatus 20 of the second embodiment obtains either the identification information D transmitted by sound communication using the sound output device 35b, or the identification information D transmitted from the information provision system 40 by referring to the reference table X. The controller 21 selects related information C that corresponds to the identification information D obtained from the broadcast system 30b or that obtained from the information provision system 40, from among a plurality of pieces of related information C registered in the reference table Y (Sd5). The related information C is displayed on the display device 24 (Sd6).

As described above, in a situation where sound communication is available (in the second facility F2), the terminal apparatus 20 is able to obtain the identification information D by sound communication, without need for the communication network 50. On the other hand, in a situation where sound communication is difficult (in the first facility F1), the terminal apparatus 20 can obtain the identification information D without requiring the sound output device 35b, which is capable of outputting sound in the scarcely audible band. Therefore, an advantage is obtained in that it is possible to ensure sufficient opportunities for the terminal apparatus 20 to obtain the identification information D.

C: Modifications

The following are examples of specific modifications that may be supplement each of the above embodiments. More than one mode may be freely selected from the following examples and combined as appropriate in so far as no contradiction arises as a result.

(1) In each of the above embodiments, the terminal position information Qb is generated using a satellite positioning system. However, the method by which the terminal apparatus 20 obtains the terminal position information Qb is not limited thereto. For example, the terminal position information Qb may be generated based on a position of a wireless base station with which the terminal apparatus 20 communicates wirelessly. The wireless base station is, for example, a radio device used for mobile communication or Wi-Fi (registered trademark). A QR code (registered trademark) representative of the terminal position information Qb may be installed in the facility F, and the terminal apparatus 20 may generate the terminal position information Qb by reading the QR code (registered trademark). Further, for example, the terminal apparatus 20 may generate the terminal position information Qb by use of short-range wireless communication, such as a beacon.

A predetermined sound corresponding to the position of the sound output device 35 (hereafter, "identification sound") may be output from the sound output device 35. The terminal apparatus 20 generates the terminal position information Qb, which represents, as the position of the terminal apparatus 20, the position corresponding to the identification sound received by the sound receiving device 26. The terminal position information Qb may be transmitted to the terminal apparatus 20 by sound communication by means of the sound output device 35. If the sound output device 35 is not capable of outputting sound in the scarcely audible band, the terminal position information Qb is transmitted to the terminal apparatus 20 by sound communication using sound in the audible band.

The terminal apparatus 20 may generate the terminal position information Qb responsive to an instruction from the user H1. For example, in a situation in which a plurality of broadcast systems 30 is installed at different levels in a building, a plurality of pieces of sound output position information Qa corresponding to different levels may be identified as the terminal position information Qb representative of the position of the terminal apparatus 20 in the building. In such a situation, the terminal position information Qb representative of the position selected by the user 1, from among the plurality pieces of sound output position information Qa of the position where the terminal apparatus 20 is located, may be generated. By reading with the terminal apparatus 20 a QR code (registered trademark) installed at each level of the building and being representative of each level, sound output position information Qa that corresponds to the level where the terminal apparatus 20 is currently located may be narrowed down from among the plurality of pieces of sound output position information Qa. By transmitting from a short-range wireless device installed at each level to the terminal apparatus 20 information representative of each level, the sound output position information Qa that corresponds to the level where the terminal apparatus 20 is currently located may be narrowed down from among the plurality of pieces of sound output position information Qa. Sound communication, beacons, or the like, for example, are used to transmit information representative of the level.

As will be understood from the above example, the terminal position information Qb need not be precisely identifiable at a single geographical point, and it is sufficient for the information to identify a general range, such as a place where the notification voice is output.

(2) In each of the above embodiments, the information provision system 40 transmits identification information D to the terminal apparatus 20 in response to an information request Rb transmitted from the terminal apparatus 20. However, the identification information D may be transmitted to the terminal apparatus 20 responsive to other triggers. For example, the identification information D may be transmitted to the terminal apparatus 20 each time the identification information D of the notification voice is added to the reference table X (i.e., push-type distribution). According to the above configuration, it is not necessary for the information request Rb to be repeatedly transmitted by the terminal apparatus 20.

The two types of transmission (push-type and pull-type) may be performed selectively, with the push-type distribution being an operation of transmitting the identification information D to the terminal apparatus 20 each time the identification information D is registered, and the pull-type distribution being an operation of transmitting the identification information D to the terminal apparatus 20 each time the information request Rb transmitted from the terminal apparatus 20 is received. For example, during a predetermined period of time (hereafter, "first period") after the information request Rb including the terminal position information Qb is received for the first time from the terminal apparatus 20, each time a pair of (i) sound output position information Qa identified based on the terminal position information Qb and (ii) identification information D, is registered in the reference table X, the information provision system 40 transmits the identification information D to the terminal apparatus 20. In other words, during the first period, the push-type distribution of the identification information D is performed each time the identification information D is registered. On the other hand, in a second period after the first period has elapsed, each time the information provision system 40 receives an information request Rb from the terminal apparatus 20, the information provision system 40 transmits to the requesting terminal apparatus 20 the identification information D identified from the reference table X based on the terminal position information Qb contained in the information request Rb. Namely, in the second period, the pull-type distribution of the identification information D is executed upon receipt of the information request Rb. According to the configuration described above, in the first period, identification information D is provided to the terminal apparatus 20 at an appropriate timing by push-type distribution of the identification information D. In the second period, identification information D can be provided only to a terminal apparatus 20 that has transmitted the information request Rb to the information provision system 40.

(3) In each of the above embodiments, identification information D of related information C that is related to the notification voice (i.e, identification information D of the notification voice) is transmitted from the information provision system 40 to the terminal apparatus 20, but the information transmitted from the information provision system 40 to the terminal apparatus 20 (hereafter, "distribution information") is not limited to the identification information D of the notification voice. For example, content information representative of the content of the notification voice (related information C in each of the above embodiments) may be transmitted as the distribution information from the information provision system 40 to the terminal apparatus 20. The terminal apparatus 20 displays the distribution information on the display device 24. The reference table Y is omitted in a configuration in which the information displayed at the terminal apparatus 20 is transmitted to the terminal apparatus 20 as distribution information as described above. As will be understood from the above examples, the distribution information is comprehensively expressed as information related to the position at which sound is output by the sound output device, and the identification information D in each of the above embodiments is an example of the distribution information.

(4) In each of the above embodiments, the reference table Y is stored in the storage device 22 of the terminal apparatus 20. However, the reference table Y may be stored in a server apparatus (hereafter, a "distribution apparatus") with which the terminal apparatus 20 is able to communicate via the communication network 50. For example, the terminal apparatus 20 notifies the distribution apparatus of the identification information D received from the information provision system 40. The distribution apparatus retrieves, from the reference table Y, related information C that corresponds to the identification information D and transmits it to the terminal apparatus 20.

In each of the above embodiments, related information C prepared in advance is displayed on the display device 24 of the terminal apparatus 20. However, the text representative of the content of a notification voice uttered by the administrator H2 may be registered in the reference table Y of the distribution apparatus as related information C. Specifically, for each utterance of the notification voice by the administrator H2, related information C is generated by way of speech recognition performed on the notification voice, and a pair of the related information C and the identification information D is registered in the reference table Y. According to the configuration described above, it is possible to provide the related information C representative of any utterance by the administrator H2, to the terminal apparatus 20 in real time in conjunction with the utterance.

(5) The type of facility F in which the above described broadcast system 30 is installed may be freely selected. Various types of facilities are assumed as those where the present disclosure is implemented, examples of which are transportation facilities, such as trains or buses; commerce 2) facilities, such as shops or restaurants; accommodation facilities, such as inns or hotels; exhibition facilities, such as museums or art galleries; tourist facilities, such as historical sites or famous places; athletic facilities, such as stadiums or gymnasiums; and the like.

(6) In each of the above embodiments, sound output position information Qa that represents the position of a fixed facility F is illustrated as an example, but in a configuration in which the broadcast system 30 is installed on a mobile entity typified by a transportation system, such as a train or a bus, sound output position information Qa that represents the mobile entity is used. The mobile entity is movable while accommodating the terminal apparatus 20. One or more sound output devices 35 are installed in the mobile entity, and a notification voice is output from the one or more sound output devices 35 inside the mobile entity. In the above configuration, for example, the name of the transportation system, the name of the route, the car number, or other information to identify the mobile entity in which the notification voice is output is used as the sound output position information Qa. Similarly, information that identifies a mobile entity in which the terminal apparatus 20 is located is used as the terminal position information Qb.

Figure 8:
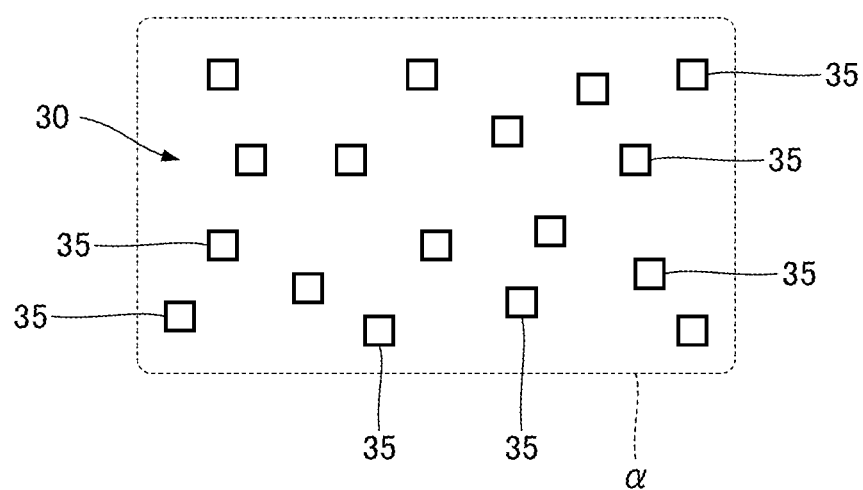
FIG. 8 is an explanatory diagram of a broadcast system in a modification.

(7) The broadcast system 30 may comprise a plurality of sound output devices 35. For example, as shown in FIG. 8, the plurality of sound output devices 35 of the broadcast system 30 are dispersed (i.e., provided in separate locations) within an area α. The area α is, for example, a specific administrative area. The plurality of sound output devices 35 in the area α outputs in common the same notification voice to notify various information about the area α. For example, an emergency radio system including sound output devices 35 installed in each dwelling in the area α is used as the broadcast system 30. The sound output position information Qa in the configuration shown in FIG. 8 is, for example, information indicative of the area α. In other words, the sound output position information Qa is the same for the entire area α. The same notification voice is output from the plurality of sound output devices 35 in the area α, and the identification information D of the notification voice is transmitted from the information provision system 40 to the terminal apparatus 20 located in the area α. As will be understood from the above example, the sound output position information Qa need not be precisely identifiable at a single geographical point, and it is sufficient for the information to identify a general range such as a place where the notification voice is output.

It is of note that the terminal apparatus 20 may be located in an area where multiple ranges overlap and in which respective different notification voices are output, such as when the terminal apparatus 20 is located at a facility F in the area α in FIG. 8. For example, it is assumed that the terminal apparatus 20 is located within an overlapping range of a range where a first sound output device 35-1 outputs sound and a range where a second sound output device 35-2 outputs sound. In such a situation, identification information D of a notification voice to be output in the area α and identification information D of a notification voice to be output in the facility F can be identified based on the terminal position information Qb of the terminal apparatus 20 (Sb5). Specifically, identification information D of a notification voice to be output by the first sound output device 35-1 and identification information D of a notification voice to be output by the second sound output device 35-2 are identified based on the terminal position information Qb. Accordingly, a plurality of pieces of identification information D corresponding to different notification voices may be transmitted to the terminal apparatus 20. Specifically, a plurality of pieces of identification information D including the identification information D of the notification voice output by the first sound output device 35-1 and the identification information D of the notification voice output by the second sound output device 35-2 are transmitted to the terminal apparatus 20. The terminal apparatus 20 displays related information C that corresponds to one of the plurality of pieces of identification information D. For example, related information C that corresponds to the identification information D of a notification voice selected by the user is displayed on the display device 24. Among the plurality of pieces of related information C, related information C that has a higher priority (for example, emergency information that is of higher emergency) may be displayed on the display device 24. A plurality of pieces of related information C that correspond to different notification voices may be displayed on the display device 24. It is of note that, in the above example, a plurality of pieces of identification information D identified by the controller 41 is transmitted to the terminal apparatus 20, but any one of the plurality of pieces of identification information D may be singly transmitted to the terminal apparatus 20.

(8) For example, in indoor environments where it is difficult to receive radio waves from positioning satellites, positioning using satellite positioning systems tends to be subject to considerable error. Accordingly, by setting a predetermined range that includes a position measured by the satellite positioning system, the position corresponding to the terminal position information Qb, the information provision system 40 may identify a plurality of pieces of sound output position information Qa representative of different positions within the range. From among the plurality pieces of sound output position information Qa, identification information D that corresponds to the sound output position information Qa selected by the user, for example, is transmitted to the terminal apparatus 20.

(9) In each of the above embodiments, from among a plurality of pieces of sound output position information Qa registered in the reference table X, sound output position information Qa that represents a position closest to a position represented by the terminal position information Qb is identified (Sb4). However, the method of identifying the sound output position information Qa is not limited thereto. For example, sound output position information Qa that indicates a position whose distance from the position indicated by the terminal position information Qb is below a threshold may be identified. Such a threshold is set, for example, variably in the information provision system 40, and the distance between the position indicated by the sound output position information Qa and the position indicated by the terminal position information Qb is compared with the threshold. For example, when the broadcast system 30 is used in a wide area α, a numerical value of several kilometers is set as the threshold, and when the broadcast system 30 is used in a facility F such as a building, a numerical value of several meters is set as the threshold.

(10) In each of the above embodiments, the identification information D of the notification voice is transmitted to the terminal apparatus 20 in conjunction with the output of the notification voice. However, the output of the notification voice in the form of the sound may be omitted. For example, a situation can be assumed in which a suspicious person enters a facility F, such as a commerce facility. In such a situation, the information provision system 40 transmits, for example, to the terminal apparatus 20 of the employee the identification information D of the related information C notifying the entry of the suspicious person. The notification voice is not output by the sound output device 35. According to the above configuration, it is possible to notify an employee of the facility F of entry of a suspicious person without causing unnecessary concern to users H1 who are present in the facility F, for example. Further, the sound output device 35 (e.g., the sound output device 35b in FIG. 6), which transmits the identification information D by sound communication, may transmit the identification information D by sound communication without outputting a notification voice.

(11) In each of the above embodiments, a notification voice that notifies users H1 in the facility F of various information is output from the sound output device 35. However, the type of sound output from the sound output device 35 is not limited thereto. For example, various types of music may be output from the sound output device 35.

(12) in the second embodiment, the terminal apparatus 20 obtains either identification information D transmitted by sound communication using the sound output device 35b or identification information D transmitted from the information provision system 40 by referring to the reference table X. However, in a situation where both sound communication using the sound output device 35 and communication using the communication network 50 are possible, the terminal apparatus 20 may obtain both the identification information D transmitted by sound communication and the identification information D transmitted from the information provision system 40.

(13) In each of the above embodiments, examples are given in which related information C is representative of the content of the notification voice. However, the content of the related information C is not limited thereto. For example, information that provides guidance on a facility F (regardless of relation to the notification voice), or information that represents a location of content related to the notification voice (e.g., a URL) may be provided to the terminal apparatus 20 as related information C. In each of the above embodiments, text displayed on the display device 24 is given as examples of the related information C. However, sound played in the terminal apparatus 20 may be used as the related information C. In other words, the method of outputting the related information C can be freely selected.

(14) The functions of the information provision system 40 according to each of the above embodiments are realized by cooperation of a processing circuit, such as a controller 41, and a program, as set out in each embodiment. The program according to each of the above embodiments can be provided in a form stored in a recording medium readable by a computer and installed therein. The recording medium is, for example, a non-transitory recording medium, a typical example of which is an optical recording medium (optical disc), such as CD-ROM, but any known form of recording medium, such as semiconductor recording medium or magnetic recording medium, is also included. Non-transitory recording media include any recording media except for transitory, propagating signals, and volatile recording media are not excluded. The program may also be provided to a computer in the form of distribution via a communication network.

D: Appendices

The following configurations, for example, may be derivable from the embodiments and modifications illustrated above.

An information providing method according to one aspect (first aspect) of the present disclosure receives, from a terminal apparatus, terminal position information representative of a position of the terminal apparatus; identifies, from among a plurality of pieces of distribution information, distribution information that corresponds to sound output position information identified based on a position represented by the received terminal position information, by referring to a reference table that associates the plurality pieces of distribution information with a plurality of pieces of sound output position information; and transmitting the identified distribution information to the terminal apparatus. Here, each of the plurality of pieces of distribution information relates to a position at which a corresponding one of sound output devices outputs sound, and each of the plurality of pieces of sound output position information is representative of a position at which the corresponding sound output device outputs the sound. According to the configuration described above, it is possible to provide a terminal apparatus with distribution information related to a position at which a sound output device outputs sound even in a situation where it is difficult to transmit the distribution information by sound communication.

In an example (second aspect) of the first aspect, each of the plurality pieces of distribution information is information related to sound that is output by the sound output device, which corresponds to the distribution information.

In an example (third aspect) of the first or second aspect, the identifying of the distribution information includes: identifying, from among the plurality of pieces of sound output position information, sound output position information that represents a position closest to the position represented by the received terminal position information; and identifying, from among the plurality of pieces of distribution information, distribution information corresponding to the identified sound output position information. According to the aspect described above, it is possible to provide a terminal apparatus with distribution information related to the position at which a sound output device, which is located close to the terminal apparatus, outputs sound.

In an example (fourth aspect) of any one of the first to third aspects, the sound output position information is information for identifying a mobile entity that moves while accommodating the terminal apparatus, the mobile entity being provided with at least one of the sound output devices. According to the aspect described above, it is possible to provide distribution information related to a mobile entity to the terminal apparatus accommodated in the mobile entity.

In an example (fifth aspect) according to any one of the first through fourth aspects, the terminal position information represents a position measured using a satellite positioning system. According to the aspect described above, it is possible to use terminal position information that accurately represents the position of the terminal apparatus.

The information providing method according an example (sixth aspect) of any one of the first to the fifth aspects performs processes of, each time sound is output by one of the sound output devices, (i) obtaining (a) distribution information relating to a position at which sound is output and (b) sound output position information representative of the position at which the sound is output; and (ii) registering a correspondence between the distribution information and the sound output position information in the reference table. According to the aspect described above, since the distribution information and the position information are registered in the reference table for each sound output by the sound output device, it is possible to provide distribution information related to the sound to the terminal apparatus in real time for each sound that is output by the sound output device.

In an example (seventh aspect) of the sixth aspect, the transmitting of the distribution information includes: (i) in a first period after receiving the terminal position information, each time a correspondence between the sound output position information and the distribution information identified based on the terminal position information is registered in the reference table, transmitting the distribution information to the terminal apparatus; and (ii) in a second period after the first period has elapsed, at each reception of the terminal position information from the terminal apparatus, transmitting, to the terminal apparatus, the distribution information identified based on the terminal position information. According to the aspect described above, in the first period, push-type distribution of the distribution information is performed, so that the distribution information can be provided to the terminal apparatus at an appropriate timing without need to receive the terminal position information. On the other hand, in the second period, the distributed information can be provided only to a terminal apparatus that has transmitted the terminal position information to the information provision system.

In an example (eighth aspect) of any one of the first to seventh aspects, the identifying of the distribution information includes, in a case where there are registered in the reference table two or more pieces of distribution information that correspond to the sound output position information identified based on the position represented by the received terminal position information, identifying distribution information that is most recent from among the two or more pieces of distribution information. According to the aspect described above, since the most recent distribution information from among two or more pieces of distribution information corresponding to a single position is transmitted to the terminal apparatus, it is possible to reduce the amount of communication or processing load for transmitting distribution information.

In an example (ninth aspect) of the first through seventh aspects, the identifying of the distribution information includes, in a case where the terminal position information represents a position within an overlapping range of, from among the sound output devices, a range within which a first sound output device outputs sound and a range within which a second sound output device outputs sound, identifying two or more pieces of distribution information including distribution information corresponding to sound output position information of the first sound output device and distribution information corresponding to sound output position information of the second sound output device, and the transmitting of the distribution information includes transmitting the two or more pieces of distribution information to the terminal apparatus. In the above aspect, in a case in where the range of sound output overlaps across a plurality of sound output devices, it is possible to provide a plurality of pieces of distribution information based on the position at which sound is output by each sound output device to the terminal apparatus.

In an example (tenth aspect) of any one of the first to ninth aspects, the terminal apparatus obtains either distribution information transmitted by sound communication using one of the sound output devices, or the distribution information transmitted by referring to the reference table. According to the aspect described above, in a situation where sound communication is available, the terminal apparatus can obtain the distribution information without the need for a communication network, and in a situation where a communication network is available, the terminal apparatus can obtain the distribution information without the need for a sound output device capable of sound communication. That is, it is possible to ensure sufficient opportunities for the terminal apparatus to obtain the distribution information.

In an example (eleventh aspect) of the tenth aspect, the terminal apparatus implements an extraction process for extracting the distribution information transmitted by sound communication using the one of the sound output devices, and the receiving of the terminal position information includes receiving the terminal position information transmitted from the terminal apparatus in a case where the distribution information is not extracted by the extraction process. According to the aspect described above, since terminal position information is transmitted from the terminal apparatus to the information provision system in a case where distribution information is not extracted by the extraction process, the processing load on the terminal apparatus and the amount of communication are reduced compared to a configuration in which, for example, the terminal position information is periodically transmitted from the terminal apparatus irrespective of whether the distribution information is extracted.

An information provision system according to one aspect (twelfth aspect) of the present disclosure includes at least one processor, and the at least one processor is configured to execute stored instructions to: receive terminal position information representative of a position of the terminal apparatus by means of a receiver; identify, from among a plurality of pieces of distribution information, distribution information that corresponds to sound output position information identified based on a position represented by the received terminal position information, by referring to a reference table that associates the plurality pieces of distribution information with a plurality of pieces of sound output position information, and each of the plurality of pieces of distribution information relates to a position at which a corresponding one of the sound output devices outputs sound, and each of the plurality of pieces of sound output position information is representative of a position at which the corresponding sound output device outputs sound; and transmit the identified distribution information from a transmitter to the terminal apparatus.

An information processing method according to one aspect (thirteenth aspect) of the present disclosure is implemented by a broadcast system communicable with an information provision system configured to register in a reference table a correspondence between distribution information relating to a position at which a sound output device outputs sound, and sound output position information representative of the position at which the sound output device outputs the sound, the method comprising: outputting sound by a sound output device; and transmitting, to the information provision system, distribution information relating to a position at which the sound output device outputs sound and sound output position information representative of the position at which the sound is output.

A non-transitory computer-readable recording medium according to one aspect of the present disclosure (fourteenth aspect) stores a program executable by a computer of a terminal apparatus communicable with an information provision system configured to refer to a reference table that associates a plurality pieces of distribution information with a plurality of pieces of sound output position information, each of the plurality of pieces of distribution information relating to a position at which a corresponding one of sound output devices outputs sound, and each of the plurality of pieces of sound output position information being representative of a position at which the corresponding sound output device outputs the sound, to perform a method of transmitting terminal position information representative of a position of the terminal apparatus to the information provision system; receiving from the information provision system distribution information that corresponds to sound output position information identified based on the position represented by the terminal position information, from among the plurality of pieces of distribution information registered in the reference table; and outputting information corresponding to the received distribution information.

DESCRIPTION OF REFERENCE SIGNS

100 . . . management system, 20 . . . terminal apparatus, 30 . . . broadcast system, 40 . . . information provision system, 21, 31, 41 . . . controller, 22, 32, 42 . . . storage device, 23, 33, 43 . . . communicator, 24 . . . display device, 25 . . . position detector, 34 . . . input device 35 . . . sound output device, 431 . . . receiver, 432 . . . transmitter, 50 . . . communication network

What is claimed is:

1. A computer-implemented information providing method, comprising:
   receiving, from a terminal apparatus, terminal position information representative of a position of the terminal apparatus;
   identifying, from among a plurality of pieces of distribution information stored in a reference table in which correspondences between the plurality pieces of distribution information and a plurality of pieces of sound output position information are registered, a piece of distribution information corresponding to a piece of sound output position information identified based on the position of the terminal apparatus represented by the received terminal position information, wherein:
      each of the plurality of pieces of distribution information relates to a position at which a corresponding one of sound output devices outputs sound, and
      each of the plurality of pieces of sound output position information is representative of a position at which the corresponding sound output device outputs the sound; and
   transmitting the identified piece of distribution information to the terminal apparatus.

2. The computer-implemented information providing method according to claim 1, wherein each of the plurality pieces of distribution information is related to sound output by the corresponding sound output device.

3. The computer-implemented information providing method according to claim 1, wherein the identifying of the piece of distribution information identifies, from among the plurality of pieces of sound output position information, a piece of sound output position information that represents a position closest to the position of the terminal apparatus represented by the received terminal position information; and further identifies, from among the plurality of pieces of distribution information, a piece of distribution information corresponding to the identified piece of sound output position information.

4. The computer-implemented information providing method according to claim 1, wherein each of the plurality of pieces of sound output position information identifies a mobile entity that moves while accommodating the terminal apparatus, the mobile entity being provided with at least one of the sound output devices.

5. The computer-implemented information providing method according to claim 1, wherein the terminal position information represents a position measured using a satellite positioning system.

6. The computer-implemented information providing method according to claim 1, further comprising:
   each time sound is output by one of the sound output devices,
      obtaining a piece of distribution information and a piece of sound output position information, wherein:
         the piece of distribution information relates to a position at which the respective sound is output, and
         the piece of sound output position information is representative of the position at which the respective sound is output; and
      registering a correspondence between the distribution information and the sound output position information in the reference table.

7. The computer-implemented information providing method according to claim 6, wherein:
   in a first period after receiving the terminal position information for the first time, each time a correspondence between the sound output position information and a piece of the distribution information identified based on the terminal position information is registered in the reference table, the transmitting of the identified piece of distribution information transmits the piece of distribution information to the terminal apparatus; and
   in a second period after the first period has elapsed, at each reception of the terminal position information from the terminal apparatus, the transmitting of the identified piece of distribution information transmits, to the terminal apparatus, a piece of the distribution information identified based on the terminal position information.

8. The computer-implemented information providing method according to claim 1, wherein the identifying of the piece of distribution information, in a case where there are registered in the reference table two or more pieces of distribution information that correspond to the identified piece of sound Output position information, identifies a piece of distribution information that is most recent from among the two or more pieces of distribution information.

9. The computer-implemented information providing method according to claim 1, wherein:
   the identifying of the piece of distribution information, in a case where the terminal position information represents a position within an overlapping range of, from among the sound output devices, a range within which a first sound output device outputs sound and a range within which a second sound output device outputs sound, identifies a first piece of distribution information corresponding, to a first piece of sound output position information of the first sound output device and a second piece of distribution information corresponding, to a second piece of sound output position information of the second sound output device, and
   the transmitting of the identified piece of distribution information transmits the first and second pieces of distribution information to the terminal apparatus.

10. The computer-implemented information providing method according to claim 1, wherein the transmitting of the identified piece of distribution information to the terminal apparatus transmits the identified piece of distribution information in a case where the terminal apparatus is in a first facility,
   the method further comprising transmitting a piece of distribution information to the terminal apparatus by sound communication using a sound output device in a case where the terminal apparatus is in a second facility.

11. The computer-implemented information providing method according to claim 1, wherein:
the terminal apparatus determines whether a piece of distribution information transmitted by sound communication is extracted, and
the receiving of the terminal position information receives the terminal position information transmitted from the terminal apparatus in a case where the distribution information is not extracted.

12. An information provision system comprising:
a receiver;
a transmitter; and
at least one processor configured to execute stored instructions to:
control the receiver to receive terminal position information representative of a position of the terminal apparatus;
identify, from among a plurality of pieces of distribution information stored in a reference table in which correspondences between the plurality pieces of distribution information and a plurality of pieces of sound output position information are registered, a piece of distribution information corresponding to a piece of sound output position information identified based on the position of the terminal apparatus represented by the received terminal position information, wherein:
each of the plurality of pieces of distribution information relates to a position at which a corresponding one of the sound output devices outputs sound, and
each of the plurality of pieces of sound output position information is representative of a position at which the corresponding sound output device outputs sound; and
control the transmitter to transmit the identified piece of distribution information to the terminal apparatus.

13. An information processing method implemented by a broadcast system communicable with an information provision system configured to register in a reference table a correspondence between distribution information relating to a position at which a sound output device outputs sound, and sound output position information representative of the position at which the sound output device outputs the sound, the method comprising:
outputting sound via a sound output device; and
transmitting, to the information provision system, distribution information relating to a position at which the sound output device outputs sound and sound output position information representative of the position at which the sound is output.

* * * * *